(12) United States Patent
Kumar et al.

(10) Patent No.: US 9,002,615 B2
(45) Date of Patent: Apr. 7, 2015

(54) METHODS AND SYSTEMS FOR MANAGING POWER OF AN ENGINE

(75) Inventors: Aditya Kumar, Schenectady, NY (US);
Santanu Chatterjee, West Chester, OH (US); Pierino Gianni Bonanni, Loudonville, NY (US); Avinash Vinayak Taware, Warwick, PA (US)

(73) Assignee: General Electric Company, Niskayuna, NY (US)

( * ) Notice: Subject to any disclaimer, the term of this patent is extended or adjusted under 35 U.S.C. 154(b) by 506 days.

(21) Appl. No.: 13/352,729

(22) Filed: Jan. 18, 2012

(65) Prior Publication Data

US 2013/0184961 A1 Jul. 18, 2013

(51) Int. Cl.
G06F 19/00 (2011.01)
G06G 7/70 (2006.01)
F02C 9/28 (2006.01)

(52) U.S. Cl.
CPC ........................................ *F02C 9/28* (2013.01)

(58) Field of Classification Search
USPC .......................... 701/100; 60/773; 374/1, 163; 73/112.01, 11; 385/12, 37; 700/44
See application file for complete search history.

(56) References Cited

U.S. PATENT DOCUMENTS

| | | | |
|---|---|---|---|
| 5,080,496 A * | 1/1992 | Keim et al. | 374/144 |
| 6,163,681 A * | 12/2000 | Wright et al. | 455/66.1 |
| 6,955,039 B2 * | 10/2005 | Nomura et al. | 60/39.27 |
| 7,031,812 B1 | 4/2006 | Pettigrew et al. | |
| 7,234,305 B2 * | 6/2007 | Nomura et al. | 60/773 |
| 7,866,159 B2 * | 1/2011 | Bowman et al. | 60/772 |
| 2004/0011020 A1 * | 1/2004 | Nomura et al. | 60/39.281 |
| 2005/0262849 A1 * | 12/2005 | Nomura et al. | 60/773 |
| 2006/0102790 A1 | 5/2006 | Atkey et al. | |
| 2007/0047615 A1 * | 3/2007 | Twerdochlib | 374/121 |
| 2008/0099603 A1 | 5/2008 | Yamamoto et al. | |
| 2008/0238202 A1 | 10/2008 | Kern et al. | |
| 2009/0070091 A1 | 3/2009 | Hanke et al. | |
| 2009/0090817 A1 | 4/2009 | Monka | |
| 2009/0295314 A1 | 12/2009 | Ganev et al. | |
| 2010/0170262 A1 | 7/2010 | Kaslusky et al. | |
| 2011/0067393 A1 | 3/2011 | Chase | |
| 2011/0071705 A1 | 3/2011 | Matuszeski et al. | |
| 2013/0282205 A1 * | 10/2013 | Bailly et al. | 701/3 |
| 2014/0327489 A1 * | 11/2014 | Tang et al. | 333/17.1 |

OTHER PUBLICATIONS

Multiple-model based sensor fault diagnosis using hybrid kalman filter approach for nonlinear gas turbine engines; Pourbabaee, B. ; Meskin, N. ; Khorasani, K.;American Control Conference (ACC), 2013; Publication Year: 2013 , pp. 4717-4723.*

(Continued)

*Primary Examiner* — Cuong H Nguyen
(74) *Attorney, Agent, or Firm* — John P. Darling

(57) ABSTRACT

A method and system for online power management of a turbine engine is provided. The method includes operating an engine control system on a first bandwidth, filtering at least one data input from the engine control system to a second bandwidth, and receiving, by a power management system operating on the second bandwidth, the at least one filtered data input. The method also includes predicting an engine operating condition using the at least one filtered data input using a closed-loop engine model, determining an optimal engine power management based on the prediction, solving a constrained optimization for a desired optimization objective, and outputting the optimal engine power management to the engine control system.

20 Claims, 4 Drawing Sheets

(56) References Cited

OTHER PUBLICATIONS

A particle filtering-based framework for real-time fault diagnosis and failure prognosis in a turbine engine; Orchard, M.E. ; Vachtsevanos, G.J.; Control & Automation, 2007. MED '07. Mediterranean Conference on; Digital Object Identifier: 10.1109/MED.2007.4433871;Publication Year: 2007 , pp. 1-6.*

PHM-Oriented Integrated Fusion Prognostics for Aircraft Engines Based on Sensor Data; Jiuping Xu ; Yusheng Wang ; Lei Xu; Sensors Journal, IEEE; vol. 14 , Issue: 4; DOI: 10.1109/JSEN.2013.2293517; Publication Year: 2014 , pp. 1124-1132.*

A Data-Level Fusion Model for Developing Composite Health Indices for Degradation Modeling and Prognostic Analysis; Kaibo Liu ; Gebraeel, N.Z. ; Jianjun Shi; Automation Science and Engineering, IEEE Transactions on; vol. 10 , Issue: 3 DOI: 10.1109/TASE.2013.2250282; Publication Year: 2013 , pp. 652-664.*

Multi-Auto Associative Neural Network based sensor validation and estimation for aero-engine; Shah, B. ; Sarvajith, M. ; Sankar, B. ; Thennavarajan, S.; AUTOTESTCON, 2013 IEEE; DOI: 10.1109/AUTEST.2013.6645076; Publication Year: 2013 , pp. 1-7.*

Model Development for Active Surge Control/Rotating Stall Avoidance in Aircraft Gas Turbine Engines; Eveker, K.M. ; Nett, C.N. American Control Conference, 1991; Publication Year: 1991 , pp. 3166-3172.*

On Markov model applications in aircraft gas turbine engine full authority digital controller test-beds; Kulikov, G.G. ; Arkov, V.Y. ; Breikin, T.V.; Control '96, UKACC International Conference on (Conf. Publ. No. 427); vol. 1; DOI: 10.1049/cp:19960537 Publication Year: 1996 , pp. 120-124 vol. 1.*

New technology for traveling with less energy; Oman, H.; Energy Conversion Engineering Conference, 1997. IECEC-97., Proceedings of the 32nd Intersociety; vol. 1; DOI: 10.1109/IECEC.1997.659271; Publication Year: 1997 , pp. 675-680 vol. 1; IEEE Conference Publications.*

A mathematical model and experimental investigation on increasing starting altitude of turbine engine; Ni Xing-Qiang ; Lin Wen Instrumentation in Aerospace Simulation Facilities, 1995. ICIASF '95 Record., International Congress on; DOI: 10.1109/ICIASF.1995.519134; Publication Year: 1995 , pp. 28/1-28/7.*

ESM: Efficient and Scalable Data Center Multicast Routing; Dan Li ; Yuanjie Li ; Jianping Wu ; Sen Su ; Jiangwei Yu Networking, IEEE/ACM Transactions on; vol. 20 , Issue: 3; DOI: 10.1109/TNET.2011.2169985; Publication Year: 2012 , pp. 944-955.*

He Zhang et al., "Power Flow Management Strategies for a Local DC Distribution System of More Electric Aircraft", Vehicle Power and Propulsion Conference (VPPC), 2010 IEEE, ISBN: 978-1-4244-8220-7, on p. 1, References Cited: 9, Issue Date :Sep. 1-3, 2010.

* cited by examiner

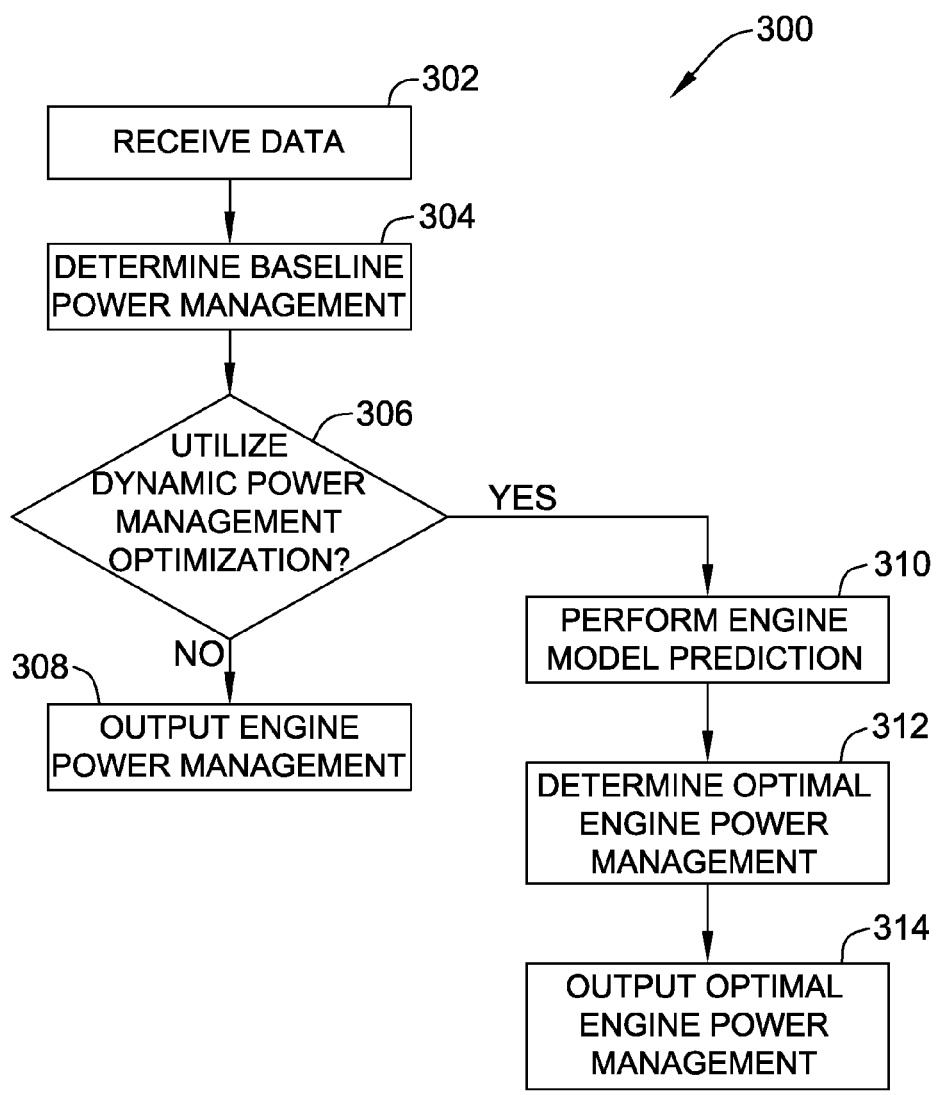

METHODS AND SYSTEMS FOR MANAGING POWER OF AN ENGINE

STATEMENT REGARDING FEDERALLY SPONSORED RESEARCH & DEVELOPMENT

This invention was made with government support under F33615-03-D-2352-GOVT awarded by U.S. Air Force. The government has certain rights in the invention.

BACKGROUND

The field of the disclosure relates generally to turbine engines and, more particularly, to methods and systems for dynamic on-line power management of an engine. In at least some known aircraft engines, the power management system is configured offline. In an offline configuration, individual optimization of control reference schedules for the controlled outputs (e.g., total thrust, fan speed), the open-loop schedules for inputs (e.g., some variable geometry), and constraint limits (e.g. fuel-air ratio, rotor speed rate of change, etc.) are determined. The reference schedules are then utilized by the engine during operation and are not updated again until the next offline configuration.

Given the increased complexity and multivariable interaction between the inputs and outputs of current engines, offline configuration of the power management system unnecessarily limits the overall performance capability of the engine despite the advanced engine control techniques used. The design of optimum power management becomes even more challenging given that some engines, especially aircraft engines, will most frequently be operating under transient conditions due to the close integration between the flight and engine controls wherein the flight controls will be continuously modulating certain critical engine control variables.

BRIEF DESCRIPTION

In one embodiment, a method for online power management of a turbine engine is provided. The method includes operating an engine control system on a first bandwidth, filtering at least one data input from the engine control system to a second bandwidth, and receiving, by a power management system operating on the second bandwidth, the at least one filtered data input. The method also includes predicting an engine operating condition using the at least one filtered data input, determining an optimal engine control based on the prediction, solving a constrained optimization for a desired optimization objective, and outputting the optimal engine control to the engine control system.

In another embodiment, a power management system is provided. The power management system includes a baseline power management component configured to receive at least one data input and a model predictive control. The model predictive control is configured to predict an engine operating condition using the at least one data input, determine an optimal engine control based on the prediction, solve a constrained optimization for a desired optimization objective, and output the optimal engine control.

In another embodiment, a gas turbine engine for use in an aircraft is provided. The gas turbine engine includes at least one sensor configured to sense an engine parameter and to generate a sensor input representing the engine parameter, a control system configured to control at least one of said gas turbine engine and the aircraft, and a power management system for dynamically managing the operation of an engine. The power management system includes a baseline power management component configured to receive at least one data input and a model predictive control. The model predictive control is configured to predict an engine operating condition using the at least one data input, determine an optimal engine control based on the prediction, solve a constrained optimization for a desired optimization objective, and output the optimal engine control.

BRIEF DESCRIPTION OF THE DRAWINGS

FIG. 4 is an exemplary flow chart for use with the power management system shown in FIG. 2.

DETAILED DESCRIPTION

The embodiments described herein provide a model within a control system, such as a Full Authority Digital Engine Control (FADEC) and/or an on-board computer. The model is used to manage power in a control system during operation using measured parameters. The embodiments described herein can be implemented within a system and are flexible enough to satisfy stringent control specifications for different operating modes of the system. For example, the embodiments described herein may be implemented in an aircraft having a wing-borne mode and jet-borne mode, wherein the embodiments described herein are adaptable to the requirements for operating in jet-borne, or hover, mode.

The following detailed description illustrates embodiments by way of example and not by way of limitation. As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Figure 1:
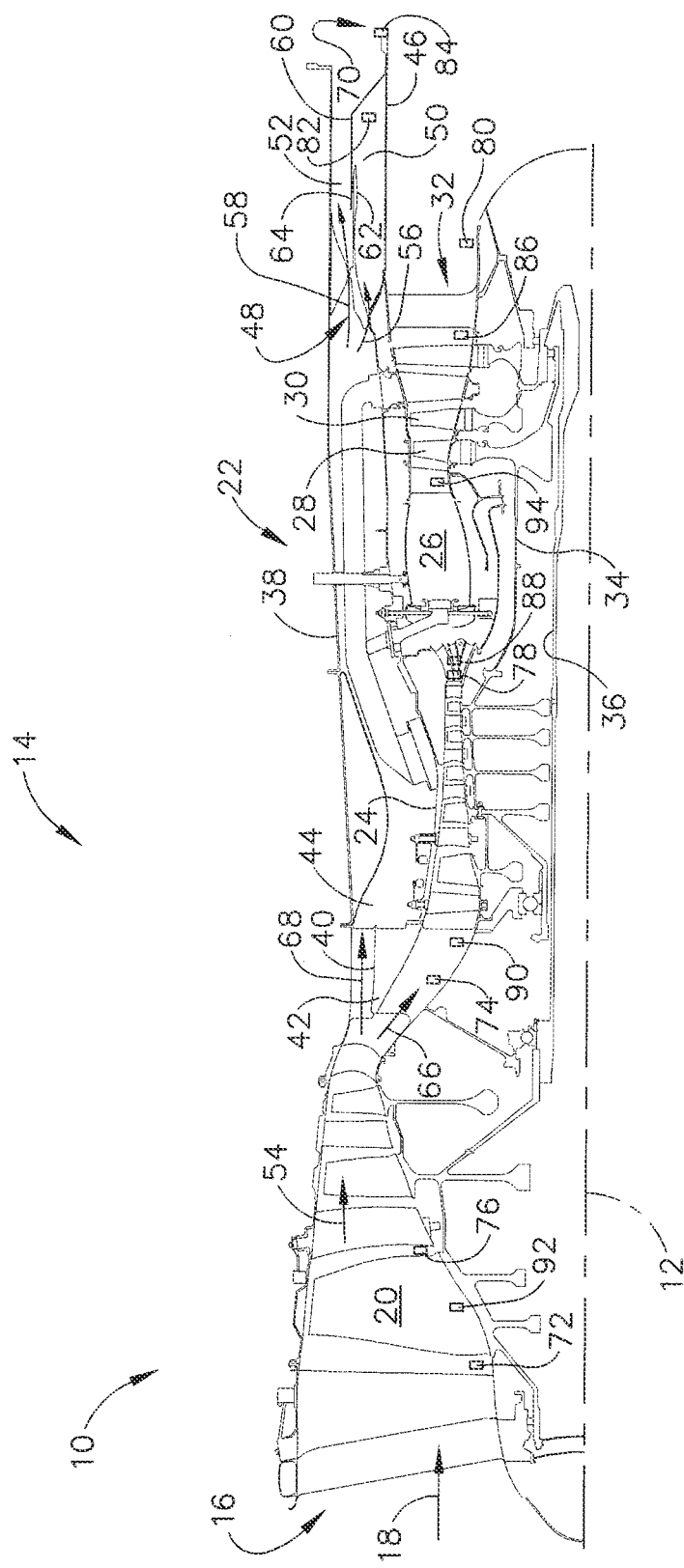
FIG. 1 is a schematic view of an exemplary variable cycle gas turbine engine.

FIG. 1 is a schematic illustration of an exemplary variable-cycle gas turbine engine 10 having a longitudinal centerline 12. Gas turbine engine 10 is shown as being used with an aircraft 14. However, it should be understood that gas turbine engine 10 can be used in any suitable commercial, industrial, and/or residential system and/or application. Gas turbine engine 10 includes an annular inlet 16 that receives ambient air 18 that is channeled downstream to a fan assembly 20. Engine 10 also includes a core gas turbine engine 22 that includes a high pressure compressor (HPC) 24, a combustor 26, a high-pressure turbine (HPT) 28, a low pressure turbine (LPT) 30 and an augmentor 32 that are coupled in an axial-flow relationship with inlet 16. HPT 28 powers HPC 24 via a first shaft 34. LPT 30 powers fan assembly 20 via a second shaft 36. Engine 10 also includes an outer casing 38 that is spaced from an inner casing 40. Inner casing 40 includes a forward section 42 that defines a bypass duct 44. In the exemplary embodiment, augmentor 32 includes a diffuser liner 46.

In the exemplary embodiment, gas turbine engine 10 also includes a valve assembly 48 coupled within bypass duct 44. Valve assembly 48 separates bypass duct 44 into a radially inner bypass duct 50 and a radially outer bypass duct 52. More specifically, in the exemplary embodiment, inner bypass duct 50 and outer bypass duct 52 are aligned substantially concentrically. Accordingly, and in the exemplary embodiment, fan bypass flow 54 entering bypass duct 44 is divided into an inner bypass flow 56 and an outer bypass flow 58 by valve assembly 48. Moreover, in the exemplary embodiment, valve assembly 48 regulates a volume of inner bypass flow 56 channeled through inner bypass duct 50 and a volume of outer bypass flow 58 that is channeled through outer bypass duct 52.

In the exemplary embodiment, a separation liner 60 contacts an aft portion 62 of valve assembly 48 and is coupled to diffuser liner 46 to facilitate channeling inner bypass flow 56 through inner bypass duct 50. Furthermore, separation liner 60 also facilitates channeling outer bypass flow 58 through outer bypass duct 52. A seal 64 extends between valve portion 62 and separation liner 60 to facilitate reducing leakage of outer bypass flow 58 into inner bypass duct 50.

During operation, air entering engine assembly 10 through inlet 16 is compressed by fan assembly 20. The flow of compressed air exiting fan assembly 20 is split into a first airflow portion 66 that is channeled into core turbine engine 22 and a second airflow portion, or bypass air 68, which is channeled through bypass duct 44. First airflow portion 66 is compressed by HPC 24 and is channeled to combustor 26. Airflow discharged from combustor 26 rotates turbines 28 and 30 prior to being discharged from engine 10 through an exhaust 70. Further, bypass air 68 channeled by valve assembly 48 is discharged from engine 10 through exhaust 70.

In the exemplary embodiment, gas turbine engine 10 is a military turbine engine, such as an F110 engine, that is available from General Electric Company, Cincinnati, Ohio. Alternatively, gas turbine engine 10 is a commercial turbine engine, such as a CFM56 gas turbine engine and/or a CF34-10 gas turbine engine, and/or a marine/industrial engine, such as an LM6000 engine, all of which are also available from the General Electric Company. Furthermore, it should be appreciated that in other embodiments, gas turbine engine 10 may be any gas turbine engine containing similar components, such as an F136 engine available from the General Electric Company.

Figure 2:
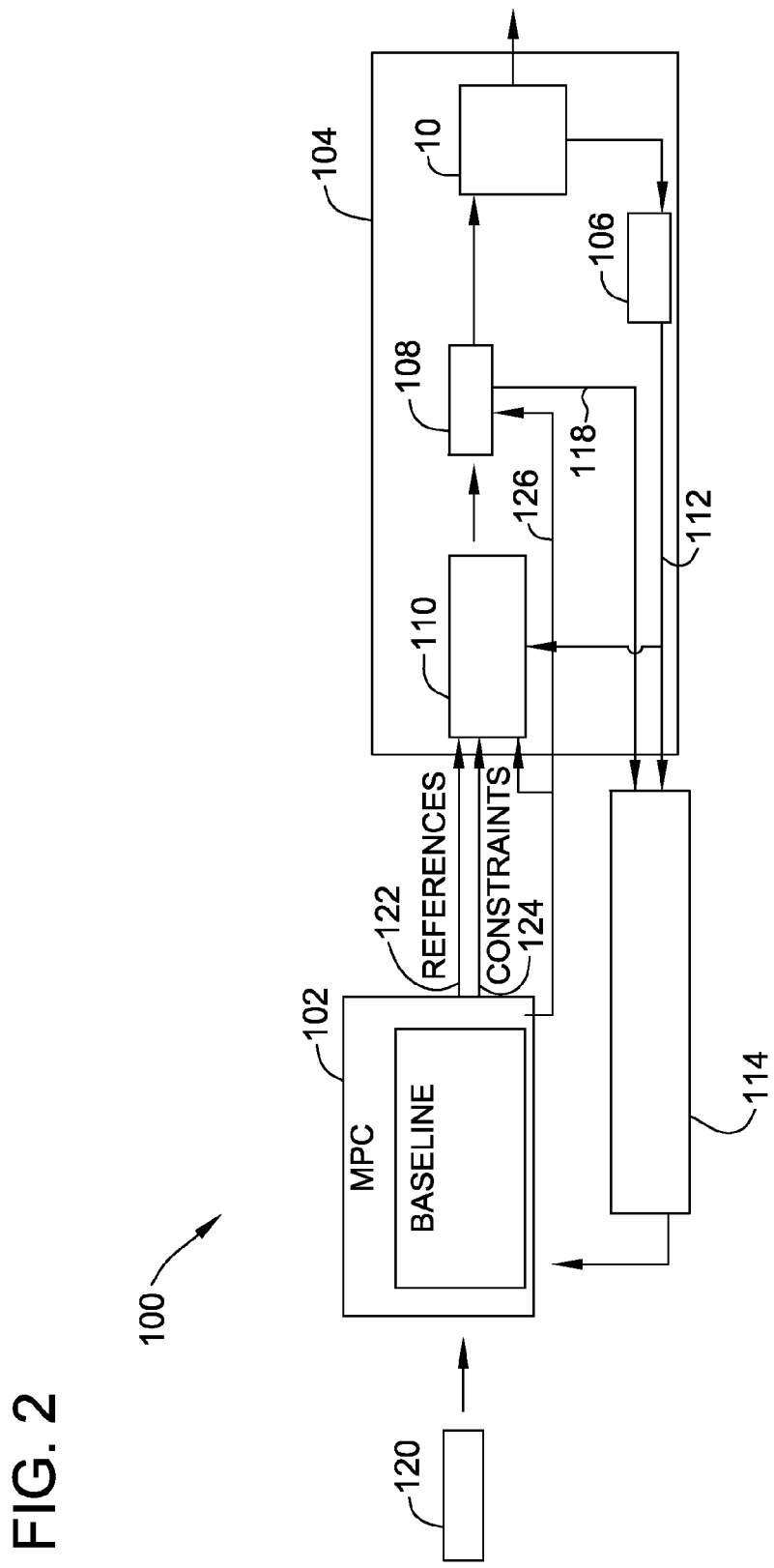
FIG. 2 is a schematic illustration of an exemplary power management system that may be used with the gas turbine engine shown in FIG. 1.

FIG. 2 is a schematic illustration of an exemplary power management system 100 that may be used with gas turbine engine 10. In the exemplary embodiment, power management system 100 includes a power management component 102 that is in communication with a closed-loop engine control system 104. Control system 104 includes engine 10, a plurality of sensors 106, a plurality of actuators 108, and an engine control 110.

Sensors 106 monitor engine and/or aircraft operation and input real-time actual sensor data or sensor input 112 during engine operation to a power management model, such as a component 102. Exemplary sensors 106 include, but are not limited to, a fan inlet temperature sensor 72, a compressor inlet total pressure sensor 74, a fan discharge static pressure sensor 76, a compressor discharge static pressure sensor 78, an exhaust duct static pressure sensor 80, an exhaust liner static pressure sensor 82, a flame detector 84, an exhaust gas temperature sensor 86, a compressor discharge temperature sensor 88, a compressor inlet temperature sensor 90, a fan speed sensor 92, and a core speed sensor 94. In the exemplary embodiment, sensors 102 monitor engine rotor speeds, engine temperatures, engine pressures, fluid flows, and/or torques.

In the exemplary embodiment, actuator position data 118 is input to component 102. Actuator position data 118 includes, but is not limited to, a fuel flow actuator, variable area actuators, variable stator actuators, and/or bleed valve positions. In the exemplary embodiment, ambient flight condition data 120 is input to component 102. Ambient flight condition data 120 includes, but is not limited to, ambient temperature, ambient pressure, aircraft mach number, and/or engine power setting parameters, such as fan speed or engine pressure ratio. In an alternative embodiment, any suitable data is input to power management system 100. In one embodiment, a low pass filter 114 is placed between sensors 106 and component 102 and between actuators 108 and component 102 such that only low pass frequencies in sensor data 112 and actuator position data 118 are received by component 102.

In the exemplary embodiment, control system 110 is implemented in a FADEC. Alternatively, control system 110 can be implemented in an on-board computer and/or any other system that is suitable for controlling engine 10 and/or aircraft 14. More specifically, in the exemplary embodiment, control system 110 controls operations of engine 10, such as fuel injection, positioning of nozzle, variable bypass, and/or lift fan areas, inner and outer blocker doors in systems with multiple bypass streams, variable stators, and/or valve positions. Further, in the exemplary embodiment, references 122 and constraints 124 are used by control system 110 to control at least one engine operation. Control system 110 also receives sensor inputs 112 to control at least one operation of engine 10.

In operation, component 102 receives data 112, 118, and 120, predicts engine performance based on received data 112, 118, and 120, and optimizes engine controls in response to the engine performance predictions. In the exemplary embodiment, component 102 outputs references 122 and constraints 124 to control system 110 and control inputs 126 directly to the actuators 108 within aircraft 14 based on the engine performance prediction.

In the exemplary embodiment, all components within control system 104 run on an inner loop bandwidth also known as a fast inner loop. In the exemplary embodiment, inner loop bandwidth provides near real-time updates of the dynamics of engine 10, control 110, sensors 106, and actuators 108. Component 102 and ambient flight condition data 120 run on an outer loop bandwidth that is also known as a slow outer loop. In the exemplary embodiment, received data 112 and 118 are an approximation of the dynamics found in the inner loop bandwidth. An approximation of the inner loop bandwidth is achieved by filtering the sensor information from the inner loop through low pass filter 114. Low pass filter 114 receives sensor data 112 and actuator position data 108 near instantaneously and averages out the fast variation of the data. In the exemplary embodiment, filter 114 provides an approximation of data 112 and 118 to component 102 of 1 second. Alternatively, filter 114 can provide any time approximation of data 112 and 118 that facilitate managing power of an engine as described herein including, but not limited to, 2 seconds and any multiple of seconds.

Figure 3:
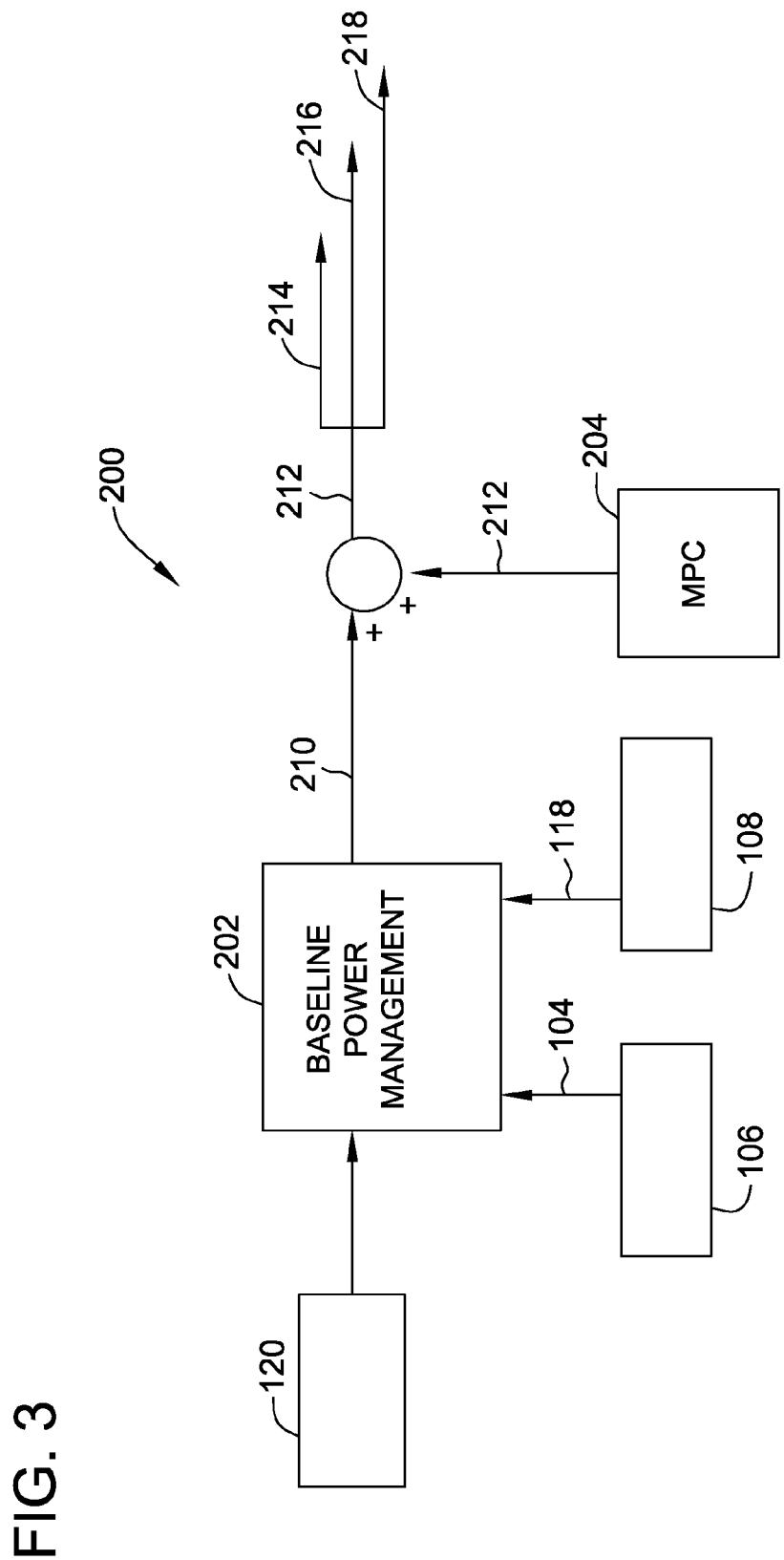
FIG. 3 is a schematic illustration of an exemplary implementation of the power management system shown in FIG. 2, employing a modification to an existing baseline power management scheme.

FIG. 3 is a schematic illustration of an exemplary implementation 200 of the power management system 100 shown in FIG. 2. In the exemplary embodiment, the implementation 200 illustrates the details of the component 102 of FIG. 2. Implementation 200 includes a baseline power management component 202 and a model predictive control (MPC) 204. In the exemplary embodiment, baseline component 202 receives sensor data 112, actuator position data 118, and ambient flight condition data 120. Baseline power management component 202 includes tables preloaded into the component that provide references and constraint limits that are preconfigured during an offline configuration. Received data 104 and 118 are compared against the preloaded tables to output a preferred control 210 that will be received by engine control 110. In the exemplary embodiment, MPC 204 reviews preferred control 210 and produces optimal modifications 212 to preferred control 210. Optimal modifications 212 can include references 214, open-loop inputs 216, and constraint limits 218.

The optimization occurs by the following manner $$O = \sum_{i=1}^{i=P_h} (Y_{ref\_filt,k+i} - Y_{i+k})^T Q(Y_{ref\_filt,k+i} - Y_{i+k}) \quad (1)$$

$$+ \sum_{i=0}^{i=c_h} \dot{\Delta}_{mpc,k+i}^T R \dot{\Delta}_{mpc,k+i} \quad (2)$$

$$+ \sum_{i=1}^{i+P_h} (L^{opt} Y_{k+i}^{opt}) \quad (3)$$

where O is the optimization objective for MPC 204, which computes the optimized variables $\Delta_{MPC}$ 212 and $\dot{\Delta}_{mpc}$ denotes their rate of change. Y represents the controlled outputs and $Y_{ref\_filt}$ are filtered references for controlled outputs from baseline power management component 202. In the exemplary embodiment, references are filtered to achieve a desired bandwidth that matches the outer loop bandwidth. $Y^{opt}$ is an optimization output and $L^{opt}$ is a linear weight for the optimization output. Q is a diagonal matrix with weights on tracking error for each control output and R is a diagonal matrix with weights on rate of change of MPC action.

In the exemplary embodiment, the use of equations (1) and (2) ensure offset-less tracking of critical controlled outputs to original design values. Equation (3) achieves max feasible improvement in desired performance objective, e.g. enhanced thrust performance (FGT), or a reduction in turbine temperature, or reduced specific fuel consumption (SFC) subject to limiting constraints. In one embodiment, a quadratic cost is used in this manner with a specified target provided for the optimization output.

In an alternative embodiment, a frequency weighted function is used to determine the optimal modifications 212. In such an embodiment, the following is used:

$$O = \sum_{i=1}^{i=P_h} (Y_{ref\_filt,k+i} - Y_{i+k})^T Q(Y_{ref\_filt,k+i} - Y_{i+k}) \quad (4)$$

$$+ \sum_{i=0}^{i=c_h} \dot{\Delta}_{mpc,k+i}^T F_{\dot{\Delta}mpc}^T(z) R F_{\dot{\Delta}mpc}(z) \dot{\Delta}_{mpc,k+i} \quad (5)$$

$$+ \sum_{i=1}^{i+P_h} (L^{opt} F_{Y^{opt}}(z) Y_{k+i}^{opt}) \quad (6)$$

Similar to (1), (2), and (3), O is the optimization objective for MPC 204, which computes the optimized variables $\Delta_{MPC}$ 212 and $\dot{\Delta}_{mpc}$ denotes their rate of change. Variable Y represents the controlled outputs and $Y_{ref\_filt}$ are filtered references for controlled outputs from baseline power management component 202. In the exemplary embodiment, references are filtered to achieve a desired bandwidth that matches the outer loop bandwidth. Variable $Y^{opt}$ is an optimization output and $L^{opt}$ is a linear weight for the optimization output. Parameter Q is a diagonal matrix with weights on tracking error for each control output, and R is a diagonal matrix with weights on rate of change of MPC 204 action. In such an $F_Y(z)$, $F_{\dot{\Delta}_{mpc}}(z)$, $F_{Y^{opt}}(z)$ embodiment, are frequency-weighting functions meant to operate on the discrete time functions. The solution to the problem in equation (4-6) is recast as an un-weighted Linear Quadratic control problem on the linear system with:

$$\vec{\dot{\Delta}}_{mpc,k} = F_{\dot{\Delta}_{mpc}}(z) \dot{\Delta}_{mpc,k} \quad (7)$$

$$\overline{Y}_k = F_Y(z) Y_k \quad (8)$$

$$\overline{Y}_k^{opt} = F_{Y^{opt}}(z) Y k^{opt} \quad (9)$$

$$\overline{Y}_{ref,k} = F_Y(z) Y_{ref,k} \quad (10)$$

The constraints on the unfiltered variables, constraint outputs $Y_k$, and MPC 204 changes $\dot{\Delta}_{mpc}$ are translated into equivalent constraints on the filtered variables $\overline{Y}_k$ and $\vec{\dot{\Delta}}_{mpc}$.

The use of (4), (5), and (6) enables systems 100 and 200 to operate without low pass filter 114. The frequency-weighting functions enable dynamic online power management at the desired lower bandwidth without interfering with the high-bandwidth performance of the closed-loop control system 104.

FIG. 4 is an exemplary flow chart 300 for use with power management system 100 shown in FIG. 2. In the exemplary embodiment, data is received 302 by component 102. In one embodiment, received 302 data includes at least one of sensor data, actuator position data, and ambient flight condition data. Alternatively, system 100 can receive any data that facilitates managing power as described herein. In the exemplary embodiment, a baseline engine power management is determined 304 from the received data. The baseline engine power management is determined 304 using baseline power management component 202, which includes predefined look-up tables. A determination is then made whether to use dynamic online power management. If the dynamic online power management is not used, determined 304 baseline engine power management is output 308. In one embodiment, engine power management includes references and constraints and is output 308 to engine controller 110. In an alternative embodiment, engine power management includes open loop input schedules and is output 308 to actuators 108 (see note about correcting signal 126 in FIG. 2). Alternatively, engine power management can include any combination of references, constraints, and open loop input schedules that can be output to any component within an engine that facilitates managing power as described herein.

If dynamic online power management is used, a closed-loop engine model prediction is performed 310 by MPC 204, using determined 304 baseline engine power management and received 302 data. In the exemplary embodiment, the closed-loop engine model predicts an operating condition of engine 10 using determined 304 baseline engine power management and received 302 data for a predetermined time in the future. In one embodiment, MPC 204 performs the model prediction 310 for 5 seconds in the future. Alternatively, MPC 204 can perform model prediction 310 for any future time increment, including, but not limited to, 1 second, 10 seconds, 30 seconds, and 60 seconds.

Using the performed 310 model prediction, an optimal engine power management is determined 312. In one embodiment, the optimal engine power management is determined 312 using an objective function. The objective functions used in determining 312 an optimal engine power management include, but are not limited to, a maximum thrust performance (FGT) or total thrust, a minimum turbine temperature, or a minimum specific fuel consumption (SFC). In one embodiment, system 100 can switch between different objectives online as desired by the user. The switching between different objectives allows dynamic power management using MPC as opposed to conventional off-line baseline power management that is manually designed offline and cannot be changed online. In the exemplary embodiment, the determined 312 optimal engine power management is obtained through optimization of the above-mentioned objective functions subject to constraints that include, but are not limited to, engine safety and operability output limits, magnitude limits, and rate limits on MPC 204 modifications.

In the exemplary embodiment, determined 312 optimal engine power management is output 314. In one embodiment, optimal engine power management includes references and constraints that are output 314 to engine controller 110. In an alternative embodiment, optimal engine power management includes open loop input schedules that are output 314 to actuators 108. Alternatively, optimal engine power management can include any combination of references, constraints, and open loop input schedules and optimal engine power management can be output to any component within an engine that facilitates managing power as described herein.

The above-described embodiments provide a dynamic online power management system for an engine. More specifically, the dynamic online power management systems described herein may be implemented in an aircraft to optimize an operating parameter, such as thrust, for controlling the gas turbine engine. Further, the power management systems described herein provide a bandwidth separation design. As such, it is possible to achieve low bandwidth power management that does not interfere with the fast bandwidth engine controls in an aircraft engine or similar dynamic physical system performance optimization space.

Exemplary embodiments of methods and systems for managing power of an engine are described above in detail. The methods and systems are not limited to the specific embodiments described herein, but rather, components of systems and/or steps of the methods may be used independently and separately from other components and/or steps described herein. For example, the methods may also be used in combination with other power management systems and methods, and are not limited to practice with only the gas turbine engine systems and methods as described herein. Rather, the exemplary embodiment can be implemented and used in connection with many other power management applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples for disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for online power management of a turbine engine, said method comprising:
   operating an engine control system on a first bandwidth;
   filtering at least one data input from the engine control system to a second bandwidth;
   receiving, by a power management system operating on the second bandwidth, the at least one filtered data input;
   predicting an engine operating condition over a desired future horizon using the at least one filtered data input and a closed-loop dynamic engine model;
   determining an optimal engine power management based on the prediction;
   solving a constrained optimization for a desired optimization objective; and
   outputting the optimal engine power management to the engine control system.

2. The method in accordance with claim 1, wherein filtering at least a data input further comprises filtering at least one of a sensor input, an actuator position input, and an ambient condition input.

3. The method in accordance with claim 1, further comprising determining a baseline engine power management using the at least one filtered data input.

4. The method in accordance with claim 3, wherein predicting an engine operating condition further comprises predicting an engine operating condition using the determined baseline engine power management.

5. The method in accordance with claim 1, wherein outputting the optimal engine power management further comprises outputting at least one of references, open-loop inputs, and constraint limits.

6. The method in accordance with claim 1, wherein filtering further comprises approximating the at least one data input.

7. The method in accordance with claim 6, wherein approximating further comprises approximating the at least one data input for a predetermined period of time.

8. A power management system for online power management of an engine, said power management system comprising:
   a baseline power management component configured to receive at least one data input from an engine control system operating on a first bandwidth, wherein said baseline power management component is configured to operate on a second bandwidth; and
   a model predictive control configured to:
     predict an engine operating condition over a desired future horizon using the at least one data input and a closed-loop model of the engine;
     determine an optimal engine power management based on the prediction;
     solve a constrained optimization for a desired optimization objective; and
     output the optimal engine power management.

9. The power management system in accordance with claim 8, wherein said baseline power management component is further configured to determine a baseline engine power management using the at least one data input.

10. The power management system in accordance with claim 8, wherein the at least one data input comprises at least one of a sensor input, an actuator position input, and an ambient condition input.

11. The power management system in accordance with claim 8, wherein said model predictive control is further configured to predict an engine operating condition over a future horizon using the determined baseline engine power management and a closed-loop engine model.

12. A power management system in accordance with claim 8, wherein the optimal engine power management further comprises at least one of references, open-loop inputs, and constraint limits.

13. The power management system in accordance with claim 8, wherein said baseline power management component is further configured to receive at least one data input filtered by a low pass filter.

14. A gas turbine engine for use in an aircraft, said gas turbine engine comprising:
- at least one sensor configured to sense an engine parameter and to generate a sensor input representing the engine parameter;
- an engine control system operating on a first bandwidth and configured to control said gas turbine engine; and
- a power management system for online power management of said gas turbine engine, said power management system comprising:
    - a baseline power management component configured to operate on a second bandwidth and to receive at least one data input from the engine control system; and
    - a model predictive control configured to:
        - predict an engine operating condition over a future horizon using the at least one data input and a closed-loop engine model;
        - determine an optimal engine control based on the prediction;
        - solve a constrained optimization for a desired optimization objective; and
        - output the optimal engine power management.

15. The gas turbine engine in accordance with claim 14, wherein said engine control system is configured to control said gas turbine engine using the optimal engine power management.

16. The gas turbine engine in accordance with claim 14, wherein said at least one sensor is at least one of a temperature sensor, a pressure sensor, a speed sensor, a torque sensor, a flow sensor, an ambient condition sensor, and an actuator position sensor.

17. The gas turbine engine in accordance with claim 14, wherein said at least one sensor and said engine control system operate in a closed-loop the first bandwidth.

18. The gas turbine engine in accordance with claim 17, wherein said power management system operates on the second bandwidth.

19. The gas turbine engine in accordance with claim 18, further comprising at least one low pass filter configured to approximate sensor input from the first bandwidth to the second bandwidth.

20. The gas turbine engine in accordance with claim 14, wherein the optimal engine power management further comprises at least one of references, open-loop inputs, and constraint limits.

* * * * *